United States Patent
Fan et al.

(10) Patent No.: US 12,511,898 B2
(45) Date of Patent: Dec. 30, 2025

(54) METHOD AND DEVICE FOR SETTING A VALUE OF AN OBJECT PROPERTY IN A SEQUENCE OF METADATA FRAMES CORRESPONDING TO A SEQUENCE OF VIDEO FRAMES

(71) Applicant: Axis AB, Lund (SE)

(72) Inventors: Xing Danielsson Fan, Lund (SE); Niclas Danielsson, Lund (SE)

(73) Assignee: AXIS AB, Lund (SE)

( * ) Notice: Subject to any disclaimer, the term of this patent is extended or adjusted under 35 U.S.C. 154(b) by 344 days.

(21) Appl. No.: 18/129,910

(22) Filed: Apr. 3, 2023

(65) Prior Publication Data
US 2023/0368528 A1    Nov. 16, 2023

(30) Foreign Application Priority Data
May 11, 2022   (EP) .................................... 22172677

(51) Int. Cl.
*G06V 20/40* (2022.01)
(52) U.S. Cl.
CPC .......... *G06V 20/40* (2022.01); *G06V 2201/10* (2022.01)
(58) Field of Classification Search
CPC ..... G06V 20/40; G06V 2201/10; H04N 7/183
See application file for complete search history.

(56) References Cited

U.S. PATENT DOCUMENTS

| 9,336,451 | B2 * | 5/2016 | Boghossian | ........... H04N 7/181 |
| 11,030,240 | B1 | 6/2021 | Janakiraman et al. | |
| 2005/0223034 | A1 | 10/2005 | Kaneko et al. | |
| 2007/0027888 | A1 * | 2/2007 | Avergun | ................. G05B 21/02 |
| 2013/0166711 | A1 | 6/2013 | Wang et al. | |
| 2014/0050352 | A1 * | 2/2014 | Buehler | ................. G06V 20/13 |
| | | | | 382/103 |
| 2014/0205139 | A1 * | 7/2014 | Kriel | ....................... G06V 20/58 |
| | | | | 382/103 |
| 2016/0117827 | A1 * | 4/2016 | Bae | ......................... G06V 20/52 |
| | | | | 382/103 |
| 2017/0116749 | A1 * | 4/2017 | Kuroda | ..................... G06T 7/20 |

(Continued)

FOREIGN PATENT DOCUMENTS

GB          2528330 A          1/2016

OTHER PUBLICATIONS

Dolby Laboratories (JP2018042253A "system and method for forming metadata in which scene is unchanged") (Year: 2017).*

*Primary Examiner* — Solomon G Bezuayehu
(74) *Attorney, Agent, or Firm* — XSENSUS LLP

(57) ABSTRACT

A method and a device for setting a value of an object property in a sequence of metadata frames corresponding to a sequence of video frames is provided. An object is detected in a plurality of video frames. For a temporally first video frame a first value of an object property is determined and the object property is set to have the first value in a metadata frame corresponding to the first video frame. For each subsequent video frame, a subsequent value of the object property is determined and a deviation is calculated with respect to a value of the object property that was last set in a metadata frame. If the deviation exceeds a non-zero threshold, the object property is set to have the subsequent value in a metadata frame corresponding to the subsequent video frame. Otherwise no value of the object property is set in that metadata frame.

13 Claims, 4 Drawing Sheets

(56) References Cited

U.S. PATENT DOCUMENTS

| | | | |
|---|---|---|---|
| 2019/0050629 A1* | 2/2019 | Olgiati | G06T 7/20 |
| 2019/0205609 A1* | 7/2019 | Taveira | G08G 5/80 |
| 2019/0213420 A1* | 7/2019 | Karyodisa | G06V 20/41 |
| 2020/0250832 A1* | 8/2020 | Li | G06T 7/246 |
| 2021/0110167 A1* | 4/2021 | Ogawa | G06V 20/40 |
| 2021/0326381 A1 | 10/2021 | Janakiraman et al. | |
| 2022/0083811 A1* | 3/2022 | Shimada | G06V 40/171 |
| 2022/0122377 A1* | 4/2022 | Kawase | G06V 40/168 |
| 2023/0256973 A1* | 8/2023 | Misu | B60W 40/08 |
| | | | 701/23 |
| 2024/0412385 A1* | 12/2024 | Yamazaki | G06T 7/246 |

\* cited by examiner

METHOD AND DEVICE FOR SETTING A VALUE OF AN OBJECT PROPERTY IN A SEQUENCE OF METADATA FRAMES CORRESPONDING TO A SEQUENCE OF VIDEO FRAMES

CROSS-REFERENCE TO RELATED APPLICATION

This application claims priority to European Patent Application No. 22172677.1 filed on May 11, 2022, the entire disclosure of which is incorporated by reference herein.

TECHNICAL FIELD

The present invention relates to the field of metadata regarding objects detected in a sequence of video frames. In particular, it relates to a method and a device for setting a value of an object property in a sequence of metadata frames corresponding to a sequence of video frames.

BACKGROUND

In the video surveillance industry, there is a trend that video cameras do not only produce video data, but also perform advanced analysis of the video data. The analysis may include detecting objects, determining properties of the detected objects, and tracking objects in a sequence of video frames produced by the camera. The results of the analysis may be provided as a sequence of metadata frames, where each metadata frame corresponds to a video frame and includes the result of the analysis performed with respect to the corresponding video frame. For example, a metadata frame may list objects detected in a corresponding video frame and their properties, such as information about position, type, size, appearance, pose, color, and attributes of the objects.

As the amount of metadata produced by the cameras increases, so does the cost for transmitting and storing the metadata. This has reached a point where the bitrate of the produced metadata often is non-negligible in relation to the bitrate of the video data produced by the camera. While much effort has been spent on compression of video to reduce its bitrate, less attention has been paid to the metadata. There is thus room for improvements.

SUMMARY OF THE INVENTION

In view of the above, it is thus an object of the present invention to mitigate the above problems and reduce the cost for transmitting and storing a sequence of metadata frames relating to objects detected in a corresponding sequence of video frames.

According to a first aspect, the above object is achieved by a method for setting a value of an object property in a sequence of metadata frames corresponding to a sequence of video frames. The method comprises: a) detecting an object in a plurality of video frames in the sequence of video frames; for a temporally first video frame among the plurality of video frames: b) determining a first value of the object property of the object as detected in the first video frame, and c) setting the object property of the object to have the first value in a metadata frame corresponding to the first video frame; for each subsequent video frame of the plurality of video frames: d) determining a subsequent value of the object property of the object as detected in the subsequent video frame, e) identifying, among metadata frames corresponding to previous video frames of the plurality of video frames, a temporally latest metadata frame in which a value of the object property of the object is set, f) determining a deviation between the subsequent value of the object property and the value of the object property set in the identified metadata frame, g) in case the deviation exceeds a non-zero object property threshold, setting the object property of the object to have the subsequent value in a metadata frame corresponding to the subsequent video frame, and h) in case the deviation does not exceed the non-zero object property threshold, setting no value of the object property of the object in the metadata frame corresponding to the subsequent video frame.

The inventors have realized that bitrate may be saved by avoiding unnecessary repetition of metadata between metadata frames. In particular, bitrate may be saved by not repeating values of object properties that remain almost the same over a period of time, i.e., when the deviation in the value of an object property does not exceed a predetermined non-zero threshold. During such a period of time, it is enough to set the value of the object property once in a first metadata frame and leave it out in the subsequent metadata frames.

It is a particular advantage that the value of an object property is only required to be almost the same as a value set in a previous metadata frame in order for it to be left out from a subsequent metadata frame. In other words, there is a particular advantage of using the claimed non-zero object property threshold. To see that this is the case, consider the situation where a stationary object, such as a parked car, is detected in a plurality of video frames. In reality the position of the object remains the same all the time. However, in practice, when determining its position in the video frames the determined position will vary by a small amount between different video frames due to measurement errors caused by noise, varying light levels in the video frames, or algorithmic imperfections. Another situation where the value of an object property is almost the same over a period of time occurs when an object having a certain color is detected in a plurality of video frames. Even if the color in reality is the same, it may be perceived slightly differently in different video frames due to changing light conditions and hence the determined value of the object color may vary by a small amount between different video frames. In these situations, the use of the non-zero object property threshold, rather than requiring the value of the object property to remain exactly the same, avoids repeating the value of the object property in the metadata even if there is a small deviation of little importance in the determined values of an object property.

However, as soon as it is detected that the value of an object property has changed by a considerable amount since a value of the object property was last set in a metadata frame, i.e., as soon as it is found that deviation exceeds the non-zero object property threshold, an updated value of the object property is set in the sequence of metadata frames. In that way, significant changes of object properties will be reflected in the sequence of metadata frames.

A sequence of video frames or metadata frames defines a temporal order of the frames. As used herein, a temporally first video frame among a plurality of video frames refers to the video frame among the plurality of video frames which comes first in the temporal order defined by the sequence of video frames. Similarly, a temporally latest metadata frame among a set of metadata frames refers to the metadata frame in the set that comes last in the temporal order defined by the sequence of metadata frames. Further, video frames which are previous to a particular subsequent video frame refer to video frames which are previous to the particular subsequent video frame in the sequence of video frames.

By a deviation between two object property values generally refers to a distance between the object property values according to a predefined distance metric. The distance metric may, for example, be the absolute-value norm or the Euclidean norm. Which distance metric to apply may depend on the object property type.

By setting a value of an object property in a metadata frame is generally meant that the value of the object property is included in the metadata frame. For example, the value may be written in text or by using numbers in the metadata frame. When the value of an object property is not set in a metadata frame, the value of the object property is not included in the metadata frame.

By a value of an object property is generally meant a value associated with the object property. A metadata frame may include several values in association with an object property. For example, a first one of the values may concern a value of the object property itself while a second one of the values concerns a confidence score of the first value. The value of the object property may refer to either of the several values that are associated with the object property.

The object property threshold may depend on the type of the object. By way of example, different object property thresholds may be set for a car and a person. A reason for allowing the object property threshold to depend on the type of the object is that different types of objects may have different importance levels from a surveillance point of view. A higher object property threshold may be set for object types of a lower importance and a lower object property threshold may be set for object types of a higher importance. In that way, less bitrate will be spent on updating object property values of objects of a lower importance level compared to objects of a higher importance level. Another reason for allowing the object property threshold to depend on the type of object is that different types of objects have motion patterns of different variability, even when staying in the same place. For example, a parked car will typically show no motion at all, while a person standing in the same place for a while may still show some motion, such as arm and head motions. A more variable motion pattern leads to a higher fluctuation of the determined value of the position and/or spatial coverage of the object over successive video frames. This leads in turn to the value of the object property being updated unnecessarily often, causing a higher bitrate cost. Therefore, a higher object property threshold may be set for an object type having a motion pattern with a higher variability, such as the person in the above example, compared to an object type having a motion pattern with a lower variability, such as the car in the above example.

The object property threshold may depend on a distance to the object from a video camera capturing the sequence of video frames. For example, the object property threshold may decrease with increasing distance to the object. This applies particularly to object properties measured in terms of pixel coordinates, such as position and spatial coverage of the object, since a movement of an object which is close to the camera will lead to a greater positional change measured in pixel coordinates than a corresponding movement of an object which is further away from the camera.

The light level and/or the signal to noise ratio, SNR, typically affects the confidence level by which a value of an object property is determined. The higher the light level and the higher the SNR, the higher the confidence level. The object property threshold may therefore depend on a light level in a scene depicted by the subsequent video frame and/or a SNR in the subsequent video frame. Specifically, a lower object property threshold may be used in lighter light conditions than in darker light conditions. Similarly, a lower object threshold threshold may be used for higher SNR than for lower SNR. Among other things, the light level in the scene affects the way color is perceived in the video frames. Setting the object property threshold depending on light level is therefore particularly relevant when the object property concerns color.

The object property threshold may depend on one or more of: a type of the object property, a resolution of the video frames in the sequence of video frames, and a ratio by which the object is occluded by another object. For example, different object property thresholds may be used for an object property concerning the position of an object in a video frame than for an appearance vector of the object. In this way, the method may be adapted to various kinds of object properties. The resolution of the video frame may have an impact on the confidence level by which a value of an object property is determined, where a higher resolution may result in a higher confidence level. A higher resolution may hence allow for a lower object property threshold, and vice versa. The ratio by which the object is occluded by another object also has an impact on the confidence level by which a value of an object property is determined, where a lower occlusion ratio leads to a higher level of confidence. A lower occlusion ratio may therefore allow for a lower object property threshold, and vice versa.

Different types of object properties may be envisaged. For example the object property may be one of: a position of the object in a video frame, a spatial coverage of the object in a video frame, a type of the object, a size of the object, a shape of the object, keypoints of the object, a color of the object, an appearance vector of the object, an attribute of the object, and an action carried out by the object. The position of the object in a video frame may be given in terms of pixel coordinates of the object, such as pixel coordinates of a center of gravity of the object. The spatial coverage of the object in the video frame may be given in terms of a bounding box. The bounding box may be defined in absolute pixel coordinates, or may be defined in relative pixel coordinates in relation to the position of the object. A key point of the object is a point of interest of the object. An appearance vector, sometimes also referred to as a feature vector, is an n-dimensional vector of numerical features that are representative of the appearance of the object. Such appearance vectors may, for example, be calculated by means of neural networks which are trained for re-identification purposes.

The object may have a plurality of object properties. In that case, method steps b)-h) may be repeated for each object property.

A metadata frame may generally include information regarding objects detected in a corresponding video frame and their object properties. The information may be provided on different levels. In particular, information which concerns all objects detected in the corresponding video frame is provided on a highest level in the metadata frame, referred to herein as a frame level. Information which concerns a specific object detected in the corresponding video frame is provided on an object level which is the next level in the metadata frame, and information which concerns a specific object property of a specific object is provided on an object property level which is the lowest level in the metadata frame.

In case no value of any object property of an object detected in a video frame has been set in the corresponding metadata frame, the method may comprise setting a flag in the metadata frame on an object level to indicate that it includes no update in the value of any object property of the object. By setting such an no-update flag on the object level, the metadata frame does not need to include any information on the object property level of that object, which saves additional bitrate.

The method may further comprise detecting a further object in a further plurality of video frames in the sequence of video frames, and repeating steps b)-h) with respect to the further object and the further plurality of video frames.

In case no value of any object property of any object detected in a video frame has been set in the corresponding metadata frame, the method may further comprise setting a flag in the metadata frame on a frame level to indicate that it includes no update in the value of any object property of any object. By setting such a no-update flag on the frame level, the metadata frame does not need to include any information on neither the object level nor the object property level. This saves additional bitrate.

A metadata frame corresponding to a video frame may include a list of objects detected in the video frame and their associated object properties.

In some embodiments, the object detected in the plurality of video frames is arranged in a same position in the list of objects in each of the metadata frames corresponding to the plurality of video frames. By arranging the object in the same position in the list of objects in each of the metadata frames, a receiver may easily identify list entries that correspond to the same object. With that knowledge the receiver can then reconstruct object property values in metadata frames in which they are not set from object property values of the same object in a previous metadata frame. These embodiments are particularly useful when the object has not been assigned an object identifier by an object tracker.

In other embodiments, the object has been tracked in the plurality of video frames, such that the object detected in each of the plurality of video frames is associated with the same object identifier. In that case, the objects in the list of objects of a metadata frame may be associated with respective object identifiers, and the object detected in the plurality of video frames is associated with a same object identifier in each of the metadata frames corresponding to the plurality of video frames. By using object identifiers, a receiver may easily identify list entries that correspond to the same object. Once the list entries have been identified, the receiver may reconstruct object property values in metadata frames in which they are not set from object property values of the same object in a previous metadata frame.

According to a second aspect, the above object is achieved by a device for setting a value of an object property in a sequence of metadata frames corresponding to a sequence of video frames. The device comprises: circuitry configured to implement: an object detection function adapted to detect an object in a plurality of video frames in the sequence of video frames; an object property setting function object property determination function adapted to: for a temporally first video frame among the plurality of video frames: determine a first value of the object property of the object as detected in the first video frame, and for each subsequent video frame of the plurality of video frames: determine a subsequent value of the object property of the object as detected in the subsequent video frame; an object property setting function adapted to: for a temporally first video frame among the plurality of video frames: set the object property of the object to have the first value in a metadata frame corresponding to the first video frame, and for each subsequent video frame of the plurality of video frames: determine a subsequent value of the object property of the object as detected in the subsequent video frame, identify, among metadata frames corresponding to previous video frames of the plurality of video frames, a temporally latest metadata frame in which a value of the object property of the object is set, determine a deviation between the subsequent value of the object property and the value of the object property set in the identified metadata frame, in case the deviation exceeds a non-zero object property threshold, setting the object property of the object to have the subsequent value in a metadata frame corresponding to the subsequent video frame, and in case the deviation does not exceed the non-zero object property threshold, setting no value of the object property of the object in the metadata frame corresponding to the subsequent video frame.

According to a third aspect of the invention, there is provided a video camera comprising the device of the third aspect.

According to a fourth aspect of the invention, the above object is achieved by a non-transitory computer readable medium comprising computer code instructions which are adapted to carry out the method of the first aspect when executed by a device having processing capabilities.

The second, third, and fourth aspects may generally have the same features and advantages as the first aspect. It is further noted that the invention relates to all possible combinations of features unless explicitly stated otherwise.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION OF EMBODIMENTS

The present invention will now be described more fully hereinafter with reference to the accompanying drawings, in which embodiments of the invention are shown.

Figure 1:
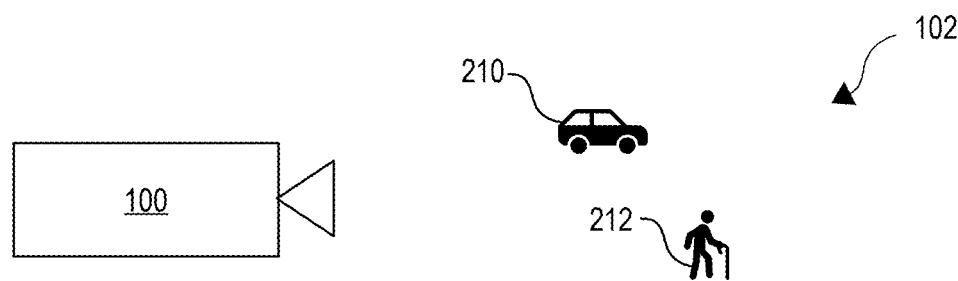
FIG. 1 schematically illustrates a video camera in which embodiments of the invention may be implemented.

FIG. 1 illustrates a video camera 100 which depicts a scene 102 in which there are objects 210, 212. The video camera 100 may be a visual light camera or a thermal camera. The objects 210, 212 may have different properties. For example, they may be of different types, here illustrated by a person and a car. They may also have different positions, shapes, sizes, colors, appearances, and may perform different actions and carry different attributes. Additionally, the properties may change over time, for example as the objects 210, 212 move around in the scene 102.

Figure 2:
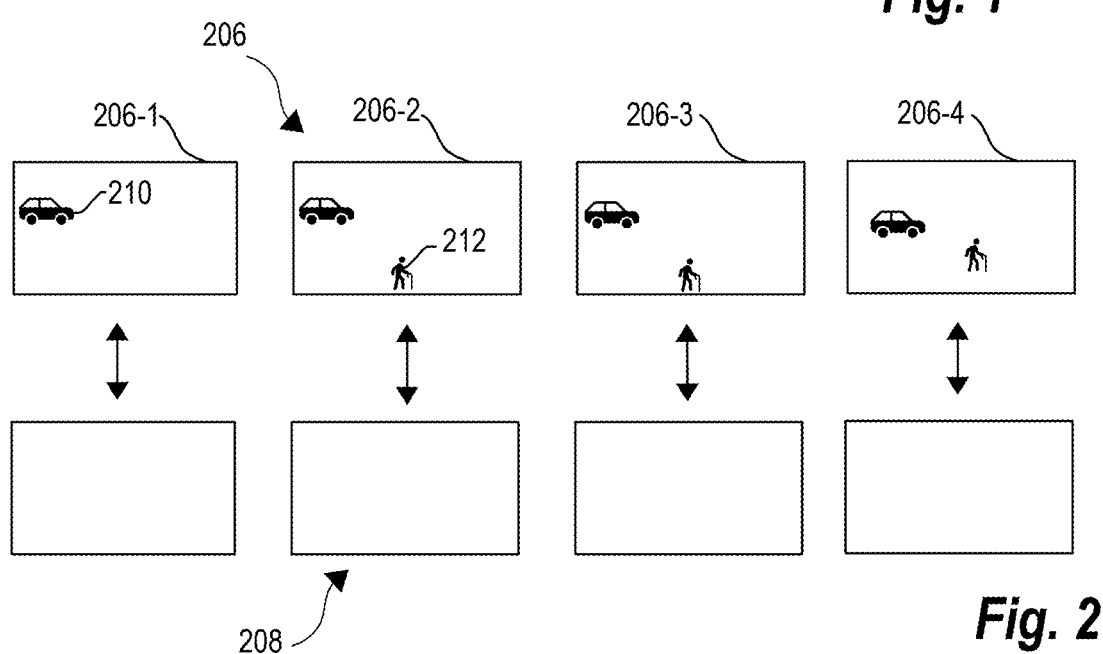
FIG. 2 schematically illustrates a sequence of video frames and a corresponding sequence of metadata frames.

As illustrated in FIG. 2, the video camera 100 produces a sequence of video frames 206 depicting the scene 102 including the objects 210, 212. The illustrated video frames 206-1 to 206-4 are understood to be a sub-sequence of the sequence of video frames 206. Additionally, the video camera 100 produces a sequence of metadata frames 208 that corresponds to the sequence of video frames 206. For each video frame there may be a corresponding metadata frame as indicated by the double-arrows in FIG. 2. The video camera 100 may transmit the sequence of video frames 206 and the sequence of metadata frames 208 to a receiver, such as a video management system. In some embodiments, the video camera 100 only transmits the metadata 208. In other embodiments, the video camera 100 only transmits the sequence of video frames 206 and the metadata frames 208 are instead produced at the receiving end.

A metadata frame corresponding to a video frame generally includes metadata about the video frame. The metadata relates to objects detected in the video frame and their properties. For example, the metadata frame may be in the form of a list, where each entry in the list corresponds to an object detected in the video frame. Within each entry, object properties of the object may be specified in the form of a sub-list, and values of the object properties may be set. Examples of object properties are: type of the object, which may take values such as "person", "car", "animal" etc.; position of the object, the value of which may be given as a pixel coordinate of the object; a spatial coverage of the object, the value of which may specify a bounding box of the object; a size of the object, the value of which may specify the height and/or width of the object; a shape of the objects, the value of which may be specified in terms of a polygon or a pixel mask; keypoints of the objects, the values of which may be specified as pixel coordinates of salient points of the object; a color of the object, including color of a part of the object such as upper or lower body color, which may take values such as "red", "blue", "green" or may be given in terms of coordinates in a color space, etc.; an appearance vector of the object, the value of which may be given in terms of a vector of numerical values reflecting an appearance of the object; an attribute of the object, such as an item carried or worn by the object, the value of which may be given in terms of "glasses", "hat", "purse", "hardhat", "bag", "worn bag", etc.; an action performed by the object which may be given in terms of "running", "walking", "sitting", etc. For some object properties not only a first value of the object property may be set but also a second value. The second value may be a confidence score which reflects a level of certainty, or likelihood, of the first value. A syntax that may be used for the metadata in the metadata frames is ONVIF profile M. Below is a schematic example of a metadata frame for a video frame in which two objects are detected.

```
{Frame: Time stamp="2019-06-10 12.24.57.321"
  {object:
    type: "person", likelihood 0.9
    position: x = "60.0", y="80.0"
    bbox: left ="20.0", top="180.0", right= "100.0" bottom= "30.0
    attribute: "stick", likelihood 0.95}
  {object:
    type: "vehicle", likelihood 0.8
    position: x="57.0", y="130.0"
    bbox: left ="40.0", top="150.0", right= "70.0" bottom= "100.0
    color: "red", likelihood 0.75}
}
```

Figure 3:
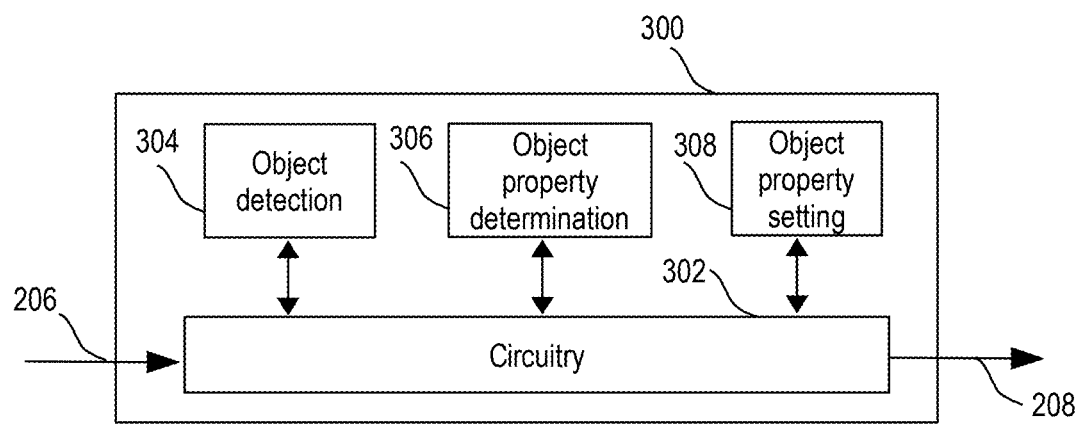
FIG. 3 schematically illustrates a device for setting a value of an object property in a sequence of metadata frames corresponding to a sequence of video frames according to embodiments.

FIG. 3 schematically illustrates a device 300 for setting a value of an object property in a sequence of metadata frames 208 corresponding to a sequence of video frames 206. The device 300 may be included in the video camera 100, or may be included in a system, such as a video management system, which receives the sequence of video frames 206 produced by the video camera 100. The device 300 includes circuitry 302 which is configured to implement an object detection function 304, an object property determination function 306, and an object property setting function 308.

In a hardware implementation, each of the functions 304, 306, 308 may correspond to a piece of circuitry which is dedicated and specifically designed to carry out the function. For example, the circuitry may be in the form of one or more integrated circuits, such as one or more application specific integrated circuits or one or more field-programmable gate arrays. By way of example, the object detection function 304 may thus comprise circuitry which, when in use, detects an object in a plurality of video frames in the sequence of video frames 206. In a software implementation, the circuitry 302 may instead be in the form of a processor, such as a central processing unit or a microprocessor, which in association with computer code instructions stored on a (non-transitory) computer-readable medium, such as a non-volatile memory, causes the device 300 to carry out any method disclosed herein. In the software case, the functions 304, 306, 308 may thus each correspond to a portion of computer code instructions stored on the computer-readable medium, that, when executed by the processor, causes the device 300 to carry out the function. Examples of non-volatile memory include read-only memory, flash memory, ferroelectric RAM, magnetic computer storage devices, optical discs, and the like. It is to be understood that it is also possible to have a combination of a hardware and a software implementation, meaning that some of the functions 304, 306, 308 are implemented in hardware and others in software.

Figure 4:
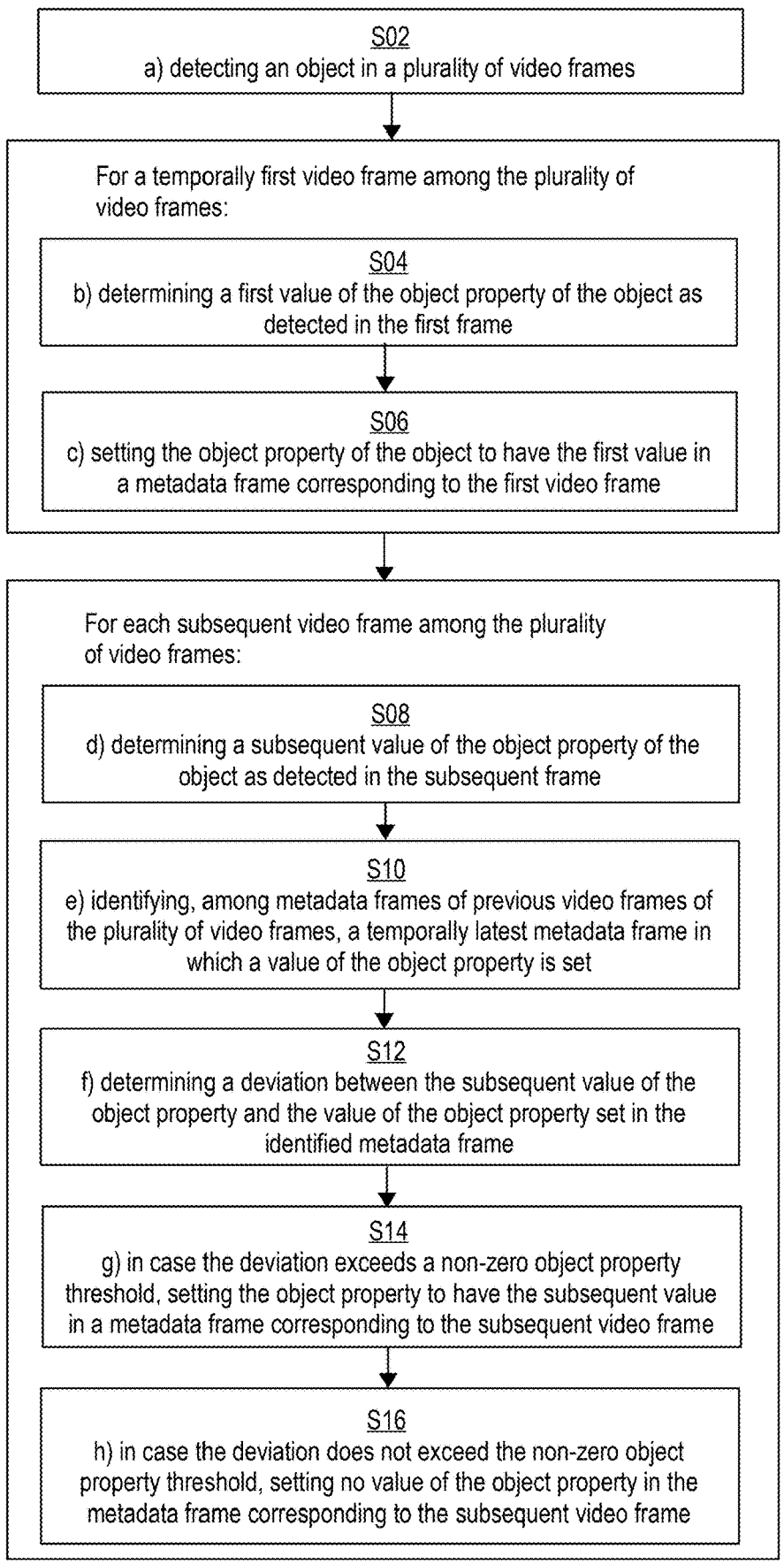
FIG. 4 is a flowchart of a method for setting a value of an object property in a sequence of metadata frames corresponding to a sequence of video frames according to embodiments.

The operation of the device 300 when carrying out a method for setting a value of an object property in the sequence of metadata frames 208 corresponding to the sequence of video frames 206 will now be described and exemplified with further reference to the flowchart of FIG. 4 and FIG. 5.

The device 300 receives the sequence of video frames 206 produced by the video camera 100. In the example of FIG. 5, the sequence of video frames 206 depicts a first object 210 which is a car. In this example, it is supposed that the first object 210 has entered the field of view of the video camera 100 in video frame 206-1. The first object 210 then remains in the same place in video frames 206-2, 206-3, but starts to move in video frame 206-4.

In step S02 of the method, the object detection function 304 detects the object 210 in a plurality of video frames 206-1, 206-2, 206-3, and 206-4 in the video sequence 206. For example, it may generate and output object detections 210-1, 210-2, 210-3, 210-4 of the first object 210 in the form of bounding boxes. In order to do so, the object detection function 304 first detects objects in the sequence of video frames 206 to generate object detections. The object detections may each be given in terms of pixel coordinates of a bounding box in a video frame. For example, it may apply a neural network-based object detection algorithm, such as R-CNN, Fast R-CNN, Faster R-CNN, YOLO or the single shot detector, SSD, to generate the object detections. In the example of FIG. 5, the object detection function 304 would hence generate object detections 210-1, 210-2, 210-3, 210-4 in video frames 206-1, 206-2, 206-3, 206-4.

The object detection function 304 further associates object detections that are detections of the same physical object. In the example of FIG. 5, the object detection function 304 hence associates object detections 210-1, 210-2, 210-3, 210-4 with each other. This may be done in different ways. In some embodiments, the association is simply made by looking at proximity and/or overlap of object detections in neighbouring video frames, such as by looking at an intersection over union of the bounding boxes of object detections in neighbouring video frames. Object detections with an intersection over union which is above a certain threshold may be associated with each other. In other embodiments, more sophisticated tracking methods that rely on Kalman filtering and the Hungarian algorithm may be used. The "Simple Online and Realtime Tracking" algorithm for multi-object tracking proposed by Bewley et al. (arXiv: 1602.00763) is an example of an algorithm that could be used. As a result of using a tracking method, object detections that are assigned to a common track will be associated with common object identifier. For example, the object detections 210-1, 210-2, 210-3, 210-4 of FIG. 5 may all be associated with a first object identifier.

The object property determination function 306 determines values V1-V4 of an object property P1 for each of the object detections 210-1, 210-2, 210-3, 210-4 of the first object 210. This can be carried out before, in parallel, or after the object detections have been associated with each other. In the example of FIG. 5 the object property P1 is the position of the object 210, but it is understood that it could have been any other of the object properties mentioned above. In more detail, in step S04 the object property determination function 306 determines a first value V1 of the object property P1 in the temporally first video frame 206-1 in which the object 210 was detected, and in step S08 it determines a subsequent value V2, V3, V4 of the object property P1 in each subsequent video frame 206-2, 206-3, 206-4 in which the object 210 was detected. The determined object property values will be associated with a certain measurement error which, for instance, is due noise in the video frames, variations in light level in the scene, or algorithmic imperfections. Thus, even if the property of the object has not changed in reality, the determined value of the object property P1 varies slightly from frame to frame. For example, as illustrated in FIG. 5, the position and shape of the bounding box of the object detections 210-1, 210-2, 210-3 varies slightly even if the object 210 in reality was stationary in these video frames. As a result, the determined values V1, V2, V3 will be slightly different.

Some object properties, such as position and spatial coverage, may be determined directly from the bounding box information which is output from the object detection function 304 while other object properties require more in-depth analysis of image contents. The object property determination function 306 may therefore implement image analysis algorithms which are adapted to analyze image contents of an object detection to, for instance, recognize type of the object, extract keypoints of the object, recognize color of an object, extract an appearance vector of the object, recognize attributes worn by the object, and/or recognizing an action performed by the object, for instance by using single image action recognition. For example, the image analysis algorithms may analyze a cut-out of image contents corresponding to the bounding box of the object detection. The image analysis algorithms may include convolutional neural network-based algorithms which are trained for these purposes. In addition to providing values of object properties, such algorithms may also output a confidence score reflecting the certainty of the value. This type of algorithms is per se known in the art and are therefore not described in more detail. As illustrated in FIG. 3, the object property determination function 306 may be separate from the object detector function 304. However, implementations may also be envisaged where these two functions are integrated into a single function, such that some, or all, of the object properties are determined at the same time as the object is detected.

As described so far, the object property determination function 306 has determined values V1, V2, V3, V4 of the object property P1 for each object detection 210-1, 210-2, 210-3, 210-4 of the object 210. However, transmitting or storing all these object property values as metadata constitutes a considerable bitrate cost. Therefore, the object property setting function 308 implements a pruning mechanism which removes redundant object property values. In particular, object property values which essentially are a repetition of a previous object property value will not be included in the sequence of metadata frames 208 that is output from the device 300. With this approach one may avoid repeatedly sending object property values that change only slightly from frame to frame, for instance due to measurement errors as explained above.

The role of the object property setting function 308 is to decide which object property values that should be set in the sequence of metadata frames 208 and which could be omitted. In more detail, in a metadata frame 208-1 corresponding to the temporally first video frame 206-1 in which the object 210 is detected, the object property setting function 308 in step S06 sets the object property P1 of the object to have its determined first value V1. In other words, the first time an object is detected in the sequence of video frames 206, values of its object properties are always set in the corresponding metadata frame.

For each subsequent video frame 206-2, 206-3, 206-4 which follows the temporally first video frame 206-1 and in which the object 210 is detected, a value of the object property P1 is only set if it differs significantly from the last time it was set. When processing a subsequent frame 206-2, 206-3, 206-4, the object property setting function 308 therefore first finds out when a value of the object property P1 was last set in a metadata frame. More specifically, when processing a subsequent frame, the object property setting function 308 in step S10 identifies, among metadata frames of previous video frames among the plurality of video frames, a temporally latest metadata frame in which a value of the object property is set. To exemplify, when processing the subsequent frame 206-2, the object property setting function 308 considers metadata frames of video frames which are previous to video frame 206-2 and in which the object 210 was detected. In this case there is only one such metadata frame, namely the metadata frame 208-1, and since a value V1 of object property P1 was set in that frame, the metadata frame 208-1 is identified in step S10.

Having identified in which metadata frame an object property value was last set, the object property setting function 308 proceeds in step S12 to determine a deviation between the subsequent value V2, V3, or V4 of the object property P1 and the value of the object property P1 set in the identified metadata frame. Thus, when processing the subsequent video frame 206-2, the subsequent object property value V2 is compared to the object property value V1 set in the metadata frame 208-1 and a deviation is determined. A deviation may for example be determined as an absolute value of a difference between the values V2 and V1.

In case the deviation for the object property P1 exceeds a non-zero object property threshold, the deviation is considered significant and the object property setting function 308 in step S14 sets the object property to have the subsequent value in a metadata frame corresponding to the subsequent video frame. However, in case the deviation does not exceed the non-zero object property threshold, the deviation is not considered significant and the object property setting function 308 in step S16 sets no value of the object property in the metadata frame.

To make the implementation of steps S10 and S12 efficient, a variable which holds the last set value of the object property may be maintained in a memory which is accessible to the object property setting function 308. As a new value of the object property is set in step S14, the variable is updated with the new value of the object property.

Returning to the FIG. 5 example, suppose that the deviation between the value V2 of object property P1 in the video frame 206-2 and the value V1 of object property P1 set in the metadata frame 208-1 does not exceed the object property threshold. Then no value of the object property P1 is set in the metadata frame 208-2. Not setting a value of the object property P1 may be implemented by simply leaving out the value where the object property P1 of the detected object is listed in the metadata frame as shown in FIG. 5. Accordingly, there will be an empty space in the metadata frame 208-2 in connection to the object property P1. To this end, it is to be noted that even if no value of the object property P1 is set in the metadata frame 208-2, the metadata frame still includes the name of the object property. In that way, one signals to a recipient that an object having the object property was detected in the corresponding video frame and that the value of the object property can be reconstructed from an object property value in a previous frame. This stands in contrast to the case where neither the object property nor its value is included in the metadata frame. In that case the receiver cannot even know that an object with the object property was detected.

The procedure in steps S10 to S16 is successively applied to each subsequent video frame 206-2, 206-3, 206-4. When processing the next subsequent video frame 206-3, the object property setting function 308 will in step S10 identify that a value of the object property P1 was last set in metadata frame 208-1, and it will in step S12 determine a deviation between the subsequent value V3 of the object property P1 and the value V1 of the object property P1 in the identified metadata frame 208-1. Suppose again that the deviation does not exceed the object property threshold. Then the object property setting function 308 will according to step S16 not set a value of the object property P1 in the metadata frame 208-3, for example by leaving an empty space in connection to the object property P1 in the metadata frame 208-3. When processing the last video frame 206-4, the object property setting function 308 will again identify metadata frame 208-1 in step S10 since no value has been set for object property P1 in metadata frames 208-2 and 208-3. In step S12 it will therefore determine a deviation between object property values V4 and V1. Suppose in this case that the deviation is above the object property threshold. Then, the object property setting function will set a value V4 of the object property P1 in the metadata frame 208-4 by including the value V4 in the metadata frame 208-4.

The non-zero object property threshold to use in steps S14 and S16 may depend on a number of parameters, and preferably a library of non-zero thresholds to use for given sets of parameters is constructed beforehand. Examples of parameters on which the non-zero object property threshold may depend are type of object, distance to the object, confidence score of the object property value, current light level in the scene as depicted in a video frame, SNR in a video frame, type of object property, resolution of the video frames, and a ratio by which the object is occluded by another object. Notably, some of these parameters, such as light level, SNR, distance to object, confidence score and occlusion ratio may dynamically differ between video frames in the video sequence. Accordingly, the non-zero object property thresholds may vary dynamically during the video sequence and may be updated on a regular basis, such as once per video frame, or on a non-regular basis, such as responsive to a trigger signal. For example, the updating of the threshold could be triggered when the light level measured by a light sensor has changed by a certain extent, or it could be triggered by user input. For example, a user could set the threshold depending on time or day or depending on how often and/or accurate he wants to get metadata updates.

The non-zero thresholds in the library may be set by estimating a confidence interval of the measurement error of an object property value for a given set of parameters, and setting the non-zero threshold to the upper bound of the confidence interval. To estimate the measurement error, object property values may repeatedly be determined for an object in a video sequence which fulfils the requirements of the given set of parameters. For example, in the example of FIG. 5, to estimate the measurement uncertainty of the position of a car, the position of a stationary car may repeatedly be determined from video frames in a video frame sequence, and a confidence interval of the measured position may be constructed. By setting the non-zero threshold in that way, only statistically significant deviations between object property values will cause new values of the object properties to be set in the metadata frames, while no values will be set for deviations which only are due to measurement errors.

Alternatively, or additionally, the user may via user input set or adjust the value of the non-zero object property threshold. For instance, the threshold may be increased or decreased in relation to the predetermined values in the library described above. In this way the user can adjust the bitrate of the sequence of metadata frames. By increasing the threshold the bitrate of the sequence of metadata frames will decrease since object property values will be set more seldom. Conversely, by decreasing the threshold the bitrate of the sequence of metadata frames will increase.

A receiver of the sequence of metadata frames may fill in missing object property values in a metadata frame using values which were set in a previous metadata frame. For example, as illustrated in FIG. 5, the receiver may fill in the missing values in metadata frames 208-2 and 208-3 using the value V1 in the previous metadata frame 208-1. As a result, the receiver would arrive at the reconstructed sequence of metadata frames 210-1, 210-2, 210-3, 210-4.

Figure 5:
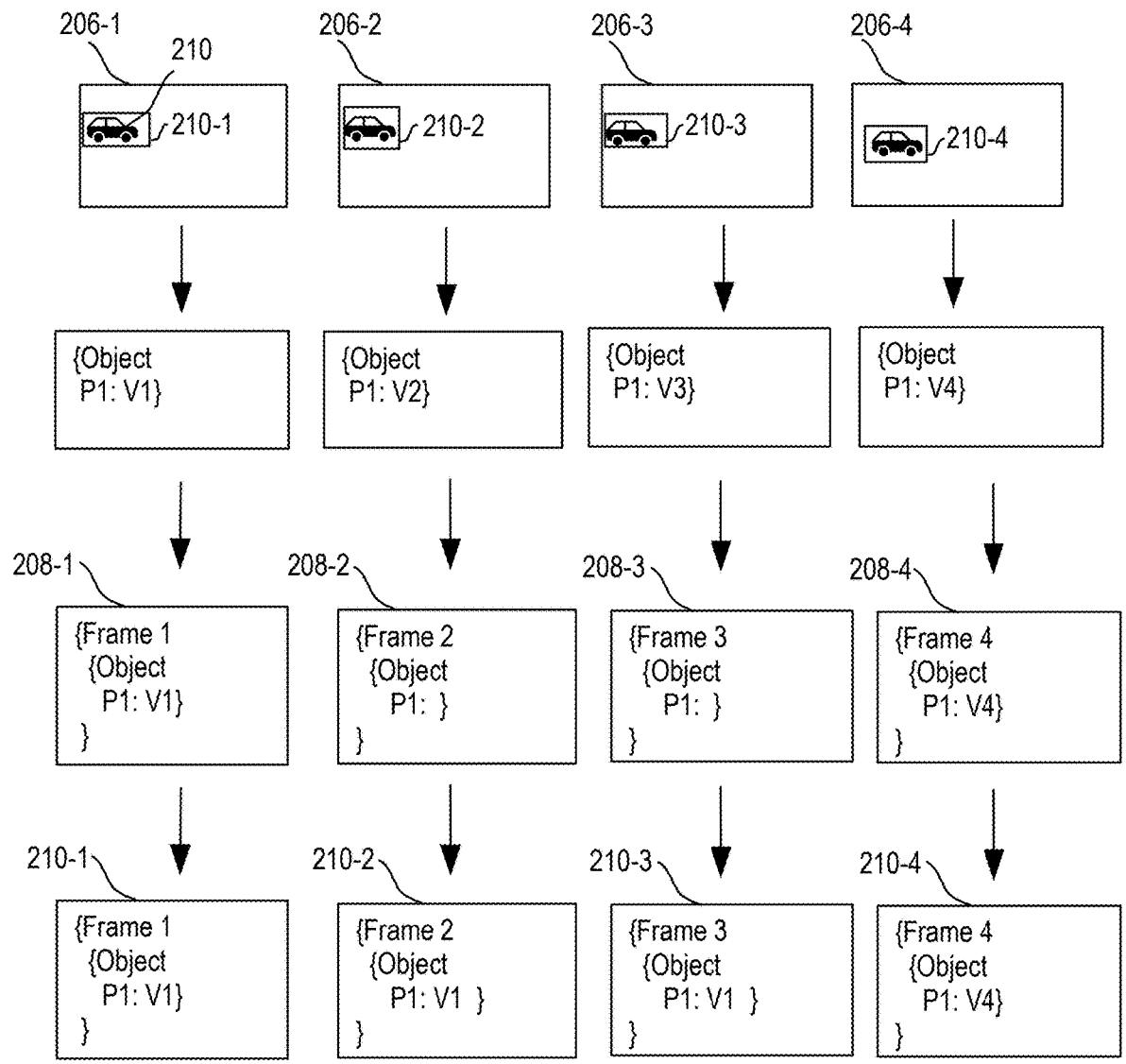
FIG. 5 schematically illustrates an example for setting a value of one object property in a sequence of metadata frames corresponding to a sequence of video frames which depicts one object.

The example of FIG. 5 illustrates the method for one object and one object property. However, the method may also be applied to more complex situations where the video sequence depicts a plurality of objects, and the objects each have a plurality of object properties. In that case, method steps S02 to S16 are repeated for each object, and method steps S04-S16 are repeated for each object property of the objects. One such example will now be described with reference to FIG. 6.

Figure 6:
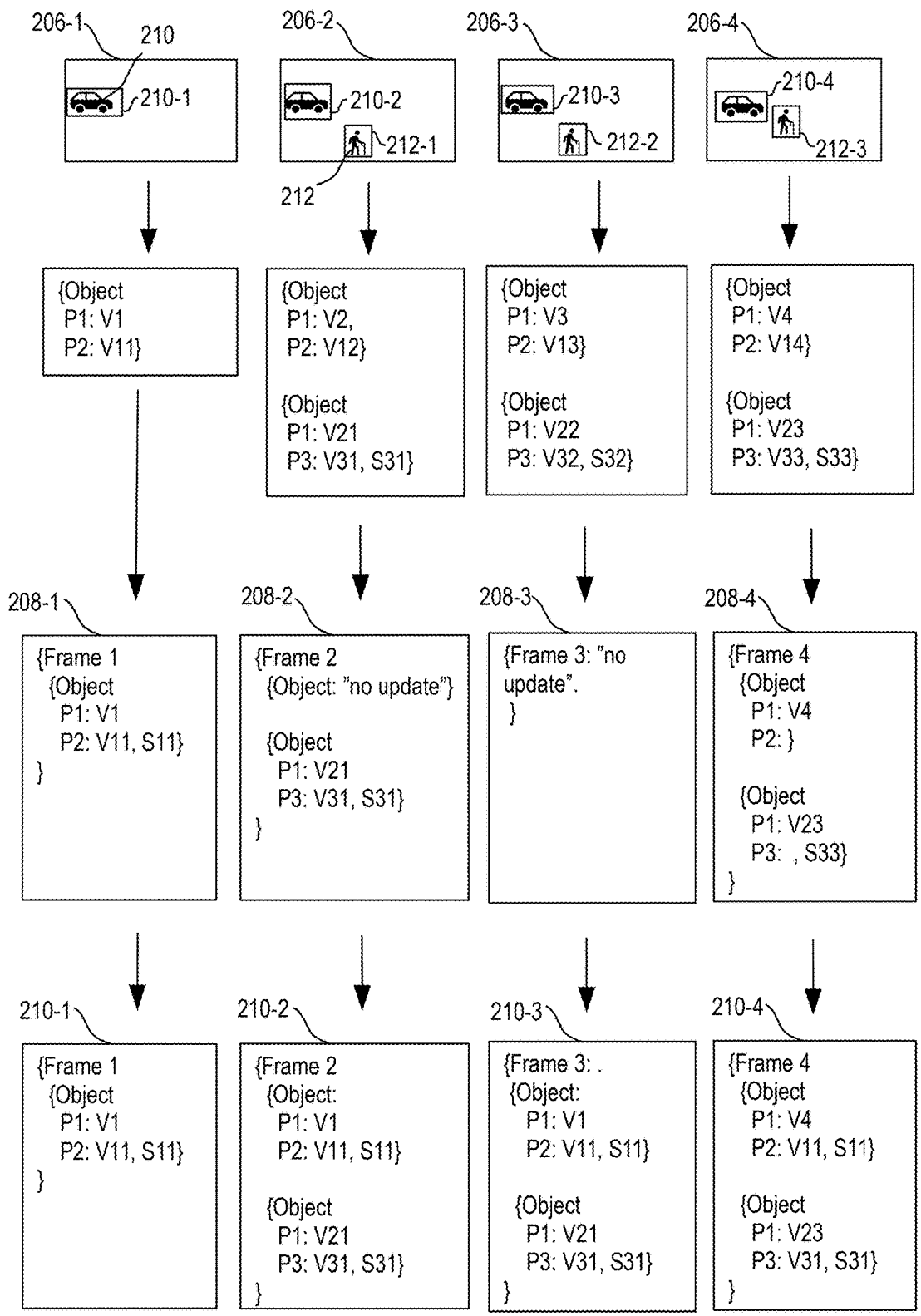
FIG. 6 schematically illustrates an example for setting a value of a plurality of object properties in a sequence of metadata frames corresponding to a sequence of video frames which depicts a plurality of objects.

In the example of FIG. 6, the video sequence depicts a second, further, object 212 in addition to the first object 210. The second object 212 is a person who enters the video sequence in frame 206-2, stays in the same place when video frame 206-3 is captured, and starts to move again in video frame 206-4. Further, each object 210, 212 now has two object properties. Object 210 has object properties P1, P2 and object 212 has object properties P1, P3. The first object property P1 is assumed to relate to the position of the object, the second property P2 is assumed to relate to the color of the object, and the third object property P3 is assumed to relate to an attribute carried by the object. In this example, it will further be assumed that the light condition and/or SNR have worsened in the video frame 206-4 compared to the previous video frames 206-1 to 206-3.

When the method is applied to this example, object detections 210-1, 210-2, 210-3, 210-4 of the first object 210 are made in a first plurality of video frames 206-1, 206-2, 206-3, 206-4 and object detections 212-1, 212-2, 212-3 of the second object 212 are made in a second, further, plurality of video frames 206-2, 206-3, 206-4. For each object detection 210-1, 210-2, 210-3, 210-4, 212-1, 212-2, 212-3 object property values of the object properties P1, P2, or P1, P3 are determined. In this case, two values are determined for the third object property P3. The first value V31, V32, V33 is a value of the object property itself, in this case the name ("stick") of an attribute of the object 212. The second value S31, S32, S33 is a confidence score which reflects the certainty of the first value V31, V32, V33.

Since only the object 210 is detected in video frame 206-1, the metadata frame 208-1 only lists one detected object. In each of the subsequent video frames 206-2, 206-3, 206-4 both objects are detected, and each of metadata frames 208-2, 208-2, 208-3, 208-4 therefore lists two detected objects. In some embodiments, the order in which the detected objects are listed in the metadata frames is of importance. In those embodiments, object detections which are associated with a same physical object should be arranged in the same position in the list of objects in each metadata frame. For example, in FIG. 6 object detections relating to the first object 210 are arranged on a first position in the list of detected objects in each of metadata frames 208-1 to 208-4, while object detections relating to the second object 210 are arranged on a second position in the list of detected objects in each of metadata frames 208-2 to 208-4. Even if the first object 210 had not been detected in one of the video frames, the object detections relating to the second object 210 should still be arranged in the second position in the list, for example by inserting an empty list item as a placeholder on the first position in the list. By arranging associated object detections in the same position in each metadata frame, a receiver of the sequence of metadata frames can easily identify associated object detections and fill in missing object property values of an object detection from a previous associated object detection.

In other embodiments, where the objects have been tracked in the sequence of video frames so as to be associated with respective object identifiers as explained above, the ordering of the object detections in the metadata frames can be made arbitrary. Instead, the object identifier of each detected object can be included in the list entry of the detected object in the metadata frames. The object identifier then allows a receiver of the metadata frames to identify associated object detections and facilitate reconstruction of missing values.

Continuing with the example of FIG. 6, the video frame 206-1 is the temporally first video frame in which the first object 210 is detected. Therefore, values of the object properties P1, P2 of the first object 210 are set in the corresponding metadata frame 208-1. The subsequent metadata frame 208-2 corresponds to video frame 206-2 in which both objects 210, 212 are detected. For the second object 212, the video frame 206-2 is the temporally first video frame in which the second object is detected. Therefore, values of the object properties P1, P3 of the second object are set in the metadata frame 208-2. For the first object 210, the values of both object properties P1, P2 were last set in metadata frame 208-1. Deviations between the values V2, V12 of the object properties P1, P2 determined in video frame 206-2 and the values V1, V11 of the object properties P1, P2 in the metadata frame 208-1 are therefore determined and compared to respective non-zero object property thresholds. As explained above, these object property thresholds may be selected from a library of thresholds and may, for instance, depend on the type of the first object 210, the type of the object properties P1, P2 and the light condition and/or SNR in the video frame. Assuming that both deviations do not exceed the respective object property threshold, no values of the object properties P1, P2 are set for the first object 210 in metadata frame 208-2. This may be done as in the FIG. 5 by simply leaving out the value in connection to the object properties P1, P2 in the list entry corresponding to the object 210. However, in case no value of any object property of an object are set in a metadata frame, it is instead preferred to include a flag in the metadata frame in the list entry corresponding to the object to indicate that it includes no update in the value of any object property of the object. This is illustrated in FIG. 6 where a "no update" flag is included in the metadata frame 208-2 in the list entry corresponding to the object 210. On a receiving side, the "no update" flag may be taken as an indication that the complete list entry for the object detection includes no update in relation to the list entry of the associated object detection in the directly preceding metadata frame. In this case, it includes no update compared to the list entry of the first (and only) object detection in metadata frame 208-1.

The next metadata frame 208-3 corresponds to video frame 206-3 in which both objects 210, 212 are detected. For the first object 210, object property values were last set in metadata frame 208-1, while for the second object 210 object property values were last set in metadata frame 208-2. Deviations between object property values V3, V13 of the first object 210 determined for the video frame 206-3 will therefore be determined with respect to the object property values set V1, V11 in metadata frame 208-1. For the second object 212, the deviations between object property values V22, V32, S32 will be determined with respect to the object property values V21, V31, S31 set in the metadata frame 208-2. Assuming that none of the determined deviations exceed a respective non-zero threshold, no values of any object property P1, P2 of any of the objects 210, 212 are set in the metadata frame 208-3. Again, the non-zero threshold may be chosen from the library depending on, for instance object type, object property type, the light condition and/or SNR in the video frame, and whether or not the value is a confidence score. Not setting the values may be done as in the FIG. 5 example by simply leaving out the values in connection to the object properties in the list entries corresponding to the objects. Alternatively, it could be done as in metadata frame 208-2 by setting a "no update" flag in the list entry of each object. However, in this case it is even more bitrate efficient to instead include a "no update" flag on a frame level, for example in a header of the metadata frame, as illustrated in metadata frame 208-3 of FIG. 6. In that way, no object list entries need to be included in the metadata frame. The "no update" flag on frame level indicates to the receiving side that the complete metadata frame includes no update in relation to the directly preceding metadata frame, in this case metadata frame 208-2.

Note that there is an important distinction between sending a metadata frame with a no update flag on a frame level compared to not sending any metadata frame at all or sending an empty metadata frame. A metadata frame with a no update flag on a frame level indicates that objects were detected in the corresponding video frame and that the metadata of the objects did not change since a previous metadata frame. In contrast, the lack of a metadata frame or an empty metadata frame rather indicates that no objects were detected in the corresponding video frame. Similarly, a metadata frame with a no update flag on an object level indicates that the object was detected in the corresponding video frame and that the metadata of the object did not change since a previous metadata frame. In contrast, not sending any metadata at all for a detected object rather indicates that the object was not detected in the corresponding video frame, for example since it left the field of view of the camera.

The final metadata frame 208-4 corresponds to video frame 206-4 in which both objects 210, 212 are detected. For the first object 210, object property values were last set in metadata frame 208-1, while for the second object 210 object property values were last set in metadata frame 208-2. Deviations between object property values V4, V23 of the first object 210 determined for the video frame 206-4 will therefore be determined with respect to the object property values V1, V11 set in metadata frame 208-1. For the second object 212, deviations between object property values V23, V33, S33 will be determined with respect to the object property values V21, V31, S31 set in the metadata frame 208-2. In this case, both objects have changed its position by a significant amount since the preceding video frame. Therefore, the deviations calculated for object property P1 exceeds the non-zero object property threshold for both objects, and values of the object property P1 are therefore set in the metadata frame 208-4 for both objects.

Concerning the second object property P2, it is for the sake of illustration assumed that the color of the object 210 is perceived differently in the video frame 206-4 compared to the preceding video frames 206-1 to 206-3 due to the worsened light condition and/or SNR in the video frame 206-4. As a result of the worsened light condition and/or SNR a higher object property threshold for object property P2 is used in video frame 206-4 compared to the previous frames. As a result of the higher object property threshold, the determined deviations in object property values for object property P2 calculated for video frame 206 will still not exceed the object property threshold and no values of object property P2 are set in the metadata frame 208-4.

Concerning the third object property P3 of object 212 in video frame 208-4, it is for the sake of illustration assumed that there is no change in the value V33 compared to the last set value V31 in video frame 208-2, and therefore the value V33 is not included in video frame 208-4. However, the deviation between the confidence score S33 and the last set confidence score S31 in video frame 208-2 exceeds the applicable non-zero threshold and is therefore set in metadata frame 208-4.

A receiver of the sequence of metadata frames 208 of FIG. 6 may reconstruct the missing values from previous metadata frames as illustrated in the reconstructed sequence of metadata frames 210-1 to 210-4. For example, the first object detection in metadata frame 208-2 is flagged as "no update" which indicates that it is identical to the associated object detection in the previous metadata frame 208-1. Hence the associated object detection in metadata frame 208-1 may be used to reconstruct the missing object detection in metadata frame 208-2 as shown in the reconstructed metadata frame 210-2. The next metadata frame 208-3 is flagged as "no update" which indicates that it includes no update in relation to the previous metadata frame 208-2. As a consequence, the corresponding reconstructed metadata frame 210-3 can be obtained as a copy of the preceding reconstructed metadata frame 210-2. Metadata frame 208-4 have missing values for the second object property P2 for the first object detection 210 and for the third object detection property P3 for the second object detection 212. The missing values indicate that the object property values are the same as in the preceding metadata frame 208-3. Accordingly, in the reconstructed metadata frame 210-4 the missing values can be reconstructed from the values in reconstructed metadata frame 210-3.

It will be appreciated that a person skilled in the art can modify the above-described embodiments in many ways and still use the advantages of the invention as shown in the embodiments above. For example, different objects may be associated with different object properties. Further, although described in connection to frames captured by a video camera, it is understood that the invention is applicable to frames captured by other types of imaging sensors including radar and lidar sensors. Thus, the invention should not be limited to the shown embodiments but should only be defined by the appended claims. Additionally, as the skilled person understands, the shown embodiments may be combined.

The invention claimed is:

1. A method of video processing by a video processing device, the method comprising the following steps:
   a) detecting an object in a plurality of video frames within a sequence of video frames;

for a temporally first video frame among the plurality of video frames:
   b) assigning an object-unique object identifier (ID) to the object detected in the first video frame, and determining a first value of an object property of the object that was detected in the first video frame, and
   c) setting the object property of the object to have the first value in a metadata frame corresponding to the first video frame;

for each object-unique object identifier in each subsequent video frame of the plurality of video frames:
   d) determining a subsequent value of the object property of the object as detected in the subsequent video frame,
   e) identifying, among a plurality of metadata frames corresponding to previous video frames of the plurality of video frames, a temporally latest metadata frame in which a value of the object property of the object is set,
   f) determining a deviation between the subsequent value of the object property and the value of the object property set in the identified temporally latest metadata frame, and one of:

g) in a case where the deviation of the value of the object property set in the identified temporally latest metadata frame exceeds a non-zero object property threshold, setting the object property of the object to have the subsequent value in a metadata frame corresponding to the subsequent video frame while maintaining the object-unique object identifier, and h) in a case where the deviation of the value of the object property set in the identified temporally latest metadata frame does not exceed the non-zero object property threshold:

h1) setting no value of the object property of the object in the metadata frame corresponding to the subsequent video frame, and h2) setting a flag in the metadata frame corresponding to the subsequent video frame on an object level to indicate that the metadata frame corresponding to the subsequent video frame includes no update to the first value of the object property of the object while maintaining the object-unique object identifier in the metadata frame corresponding to the subsequent video frame.

2. The method of claim 1, wherein the object property threshold depends on a type of the object.

3. The method of claim 1, wherein the object property threshold depends on a distance to the object from a video camera capturing the sequence of video frames.

4. The method of claim 1, wherein the object property threshold depends on at least one of:
a light level in a scene depicted by the subsequent video frame, or
a signal to noise ratio in the subsequent video frame.

5. The method of claim 1, wherein the object property threshold depends on at least one of:
a type of the object property,
a resolution of the video frames in the sequence of video frames, or
a ratio by which the object is occluded by another object.

6. The method of claim 1, wherein the object property is at least one of:
a position of the object in a corresponding video frame,
a spatial coverage of the object in the corresponding video frame,
a type of the object,
a size of the object,
a shape of the object,
a keypoint of the object,
a color of the object,
an appearance vector of the object,
an attribute of the object, or
an action carried out by the object.

7. The method of claim 1, wherein the object has a plurality of object properties and the steps b)-h) are repeated for each object property.

8. The method of claim 1, further comprising:
detecting a further object in a further plurality of video frames in the sequence of video frames, and
repeating steps b)-h) with respect to the further object and the further plurality of video frames.

9. The method of claim 1,
wherein each metadata frame includes a list of objects detected in a corresponding video frame and their associated object properties, and
wherein each object detected in the plurality of video frames is arranged in a same position in the list of objects in each of the metadata frames.

10. The method of claim 1,
wherein each metadata frame includes a list of objects detected in a corresponding video frame and their associated object properties, the objects in the list of objects being associated with respective object identifiers.

11. A video processing device comprising:
circuitry configured to implement a process comprising:
a) detecting an object in a plurality of video frames within a sequence of video frames;
for a temporally first video frame among the plurality of video frames:
b) assigning an object-unique object identifier (ID) to the object detected in the first video frame, and determining a first value of an object property of the object that was detected in the first video frame, and
c) setting the object property of the object to have the first value in a metadata frame corresponding to the first video frame;
for each object-unique object identifier in each subsequent video frame of the plurality of video frames:
d) determining a subsequent value of the object property of the object as detected in the subsequent video frame,
e) identifying, among a plurality of metadata frames corresponding to previous video frames of the plurality of video frames, a temporally latest metadata frame in which a value of the object property of the object is set,
f) determining a deviation between the subsequent value of the object property and the value of the object property set in the identified temporally latest metadata frame, and one of:
g) in a case where the deviation of the value of the object property set in the identified temporally latest metadata frame exceeds a non-zero object property threshold, setting the object property of the object to have the subsequent value in a metadata frame corresponding to the subsequent video frame while maintaining the object-unique object identifier, and
h) in a case where the deviation of the value of the object property set in the identified temporally latest metadata frame does not exceed the non-zero object property threshold:

h1) setting no value of the object property of the object in the metadata frame corresponding to the subsequent video frame, and h2) setting a flag in the metadata frame corresponding to the subsequent video frame on an object level to indicate that the metadata frame corresponding to the subsequent video frame includes no update to the first value of the object property of the object while maintaining the object-unique object identifier in the metadata frame corresponding to the subsequent video frame.

12. A video camera comprising the device of claim 11.

13. A non-transitory computer readable medium comprising computer code instructions which are adapted to carry out the method of claim 1 when executed by a device having processing capabilities.

* * * * *